US010104287B2

(12) United States Patent
Satoh

(10) Patent No.: US 10,104,287 B2
(45) Date of Patent: Oct. 16, 2018

(54) IMAGE PROCESSING SYSTEM, IMAGE GENERATION APPARATUS, AND IMAGE GENERATION METHOD

(71) Applicant: Tetsuya Satoh, Miyagi (JP)

(72) Inventor: Tetsuya Satoh, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 159 days.

(21) Appl. No.: 15/016,991

(22) Filed: Feb. 5, 2016

(65) Prior Publication Data

US 2016/0234438 A1 Aug. 11, 2016

(30) Foreign Application Priority Data

Feb. 6, 2015 (JP) ................... 2015-021783
May 26, 2015 (JP) ................... 2015-106010

(51) Int. Cl.
*H04N 7/00* (2011.01)
*H04N 5/232* (2006.01)
(Continued)

(52) U.S. Cl.
CPC ....... *H04N 5/23238* (2013.01); *G06T 3/0018* (2013.01); *G06T 5/006* (2013.01); *H04N 5/23245* (2013.01)

(58) Field of Classification Search
CPC ... G06T 3/0018; G06T 5/006; H04N 5/23238; H04N 5/23245
See application file for complete search history.

(56) References Cited

U.S. PATENT DOCUMENTS 5,067,019 A 11/1991 Juday et al.
5,359,363 A 10/1994 Kuban et al.
(Continued)

FOREIGN PATENT DOCUMENTS

CN 103546680 A 1/2014
CN 103685917 A 3/2014
(Continued)

OTHER PUBLICATIONS

Extended European Search Report dated Jul. 13, 2016 in Patent Application No. 16154457.2.
(Continued)

*Primary Examiner* — Sathyanaraya V Perungavoor
*Assistant Examiner* — Peet Dhillon
(74) *Attorney, Agent, or Firm* — Oblon, McClelland, Maier & Neustadt, L.L.P.

(57) ABSTRACT

An image processing system, an image generation apparatus, and an image generation method are provided. The image processing system includes a switching unit configured to switch an operating mode of the image processing system between at least a first mode and a second mode, a detection unit configured to detect a joining position among a plurality of input images to generate a detection result, and a joining unit configured to join the plurality of input images to generate an output image. When the mode is switched to the first mode, the joining unit joins the plurality of input images based on the detection result of the detection unit to generate the output image. When the mode is switched to the second mode, the joining unit joins the plurality of input images to generate the output image, without causing the detection unit to generate the detection result.

13 Claims, 13 Drawing Sheets

(51) Int. Cl.
*G06T 3/00* (2006.01)
*G06T 5/00* (2006.01)

(56) References Cited

U.S. PATENT DOCUMENTS

| | | | | |
|---|---|---|---|---|
| 2010/0265314 | A1* | 10/2010 | Nakashio | G06T 3/4038 348/36 |
| 2013/0076856 | A1 | 3/2013 | Wakabayashi | |
| 2014/0071227 | A1* | 3/2014 | Takenaka | H04N 5/23238 348/36 |
| 2015/0009356 | A1* | 1/2015 | Sanno | H04N 5/23219 348/222.1 |

FOREIGN PATENT DOCUMENTS

| | | |
|---|---|---|
| JP | 2001-052152 | 2/2001 |
| JP | 2004-333446 | 11/2004 |
| JP | 2008-263646 | 10/2008 |
| JP | 2009-055332 | 3/2009 |
| JP | 2013-074473 | 4/2013 |
| JP | 2013-187726 | 9/2013 |
| JP | 2013-187860 | 9/2013 |
| JP | 2015-019344 | 1/2015 |
| JP | 2015-046044 | 3/2015 |
| JP | 2015-046051 | 3/2015 |
| JP | 5843033 | 11/2015 |
| JP | 5843034 | 11/2015 |
| JP | 2015-226144 | 12/2015 |
| JP | 5846268 | 12/2015 |

OTHER PUBLICATIONS

Stephen L. Bogner, "An Introduction to Panospheric Imaging", IEEE International Conference on Systems, Man and Cybernetics, vol. 4, XP000594429, Oct. 22, 1995, pp. 3099-3106.

Shree K. Nayar, "Omnidirectional Video Camera", Darpa Image Understanding Workshop, May 1, 1997, XP000909226, pp. 235-241.

Japanese Office Action dated Jul. 28, 2015 in Patent Application No. 2015-106010.

Office Action dated Feb. 14, 2017 in European Patent Application No. 16 154 457.2.

Combined Office Action and Search Report dated Apr. 18, 2018 in Chinese Patent Application No. 201610036980.X with English translation of categories of cited documents, therein, 12 pages.

* cited by examiner

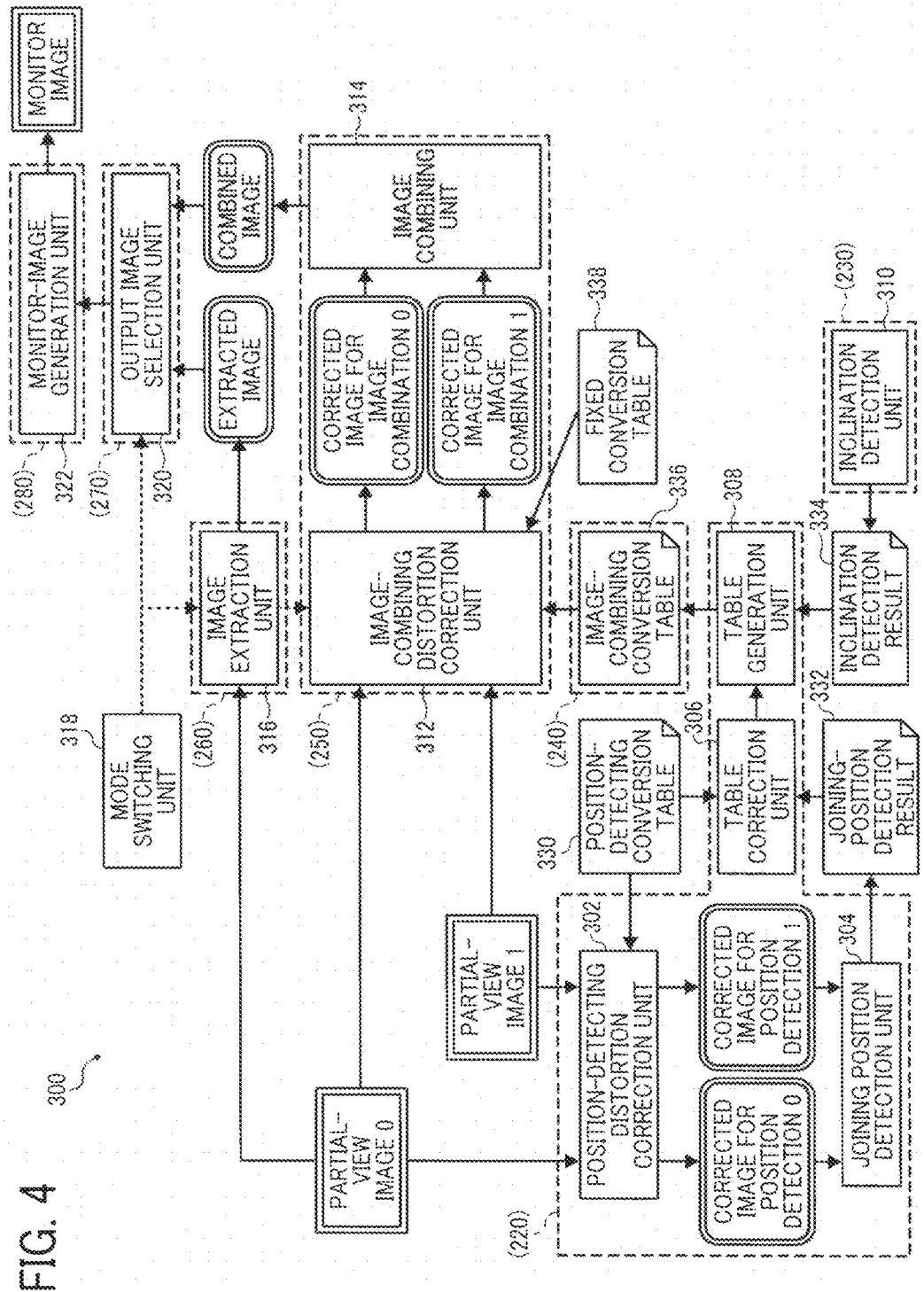

| POST-CONVERSION COORDINATE VALUE | | PRE-CONVERSION COORDINATE VALUE | |
|---|---|---|---|
| θ (pix) | φ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

FIG. 10

| POST-CONVERSION COORDINATE VALUE | | JOINING POSITION (AMOUNT OF SHIFTING) | |
|---|---|---|---|
| $\theta$ (pix) | $\phi$ (pix) | $\Delta\theta$ (pix) | $\Delta\phi$ (pix) |
| 0 | 0 | | |
| 1 | 0 | | |
| ⋮ | ⋮ | ⋮ | ⋮ |
| 3598 | 1799 | | |
| 3599 | 1799 | | |

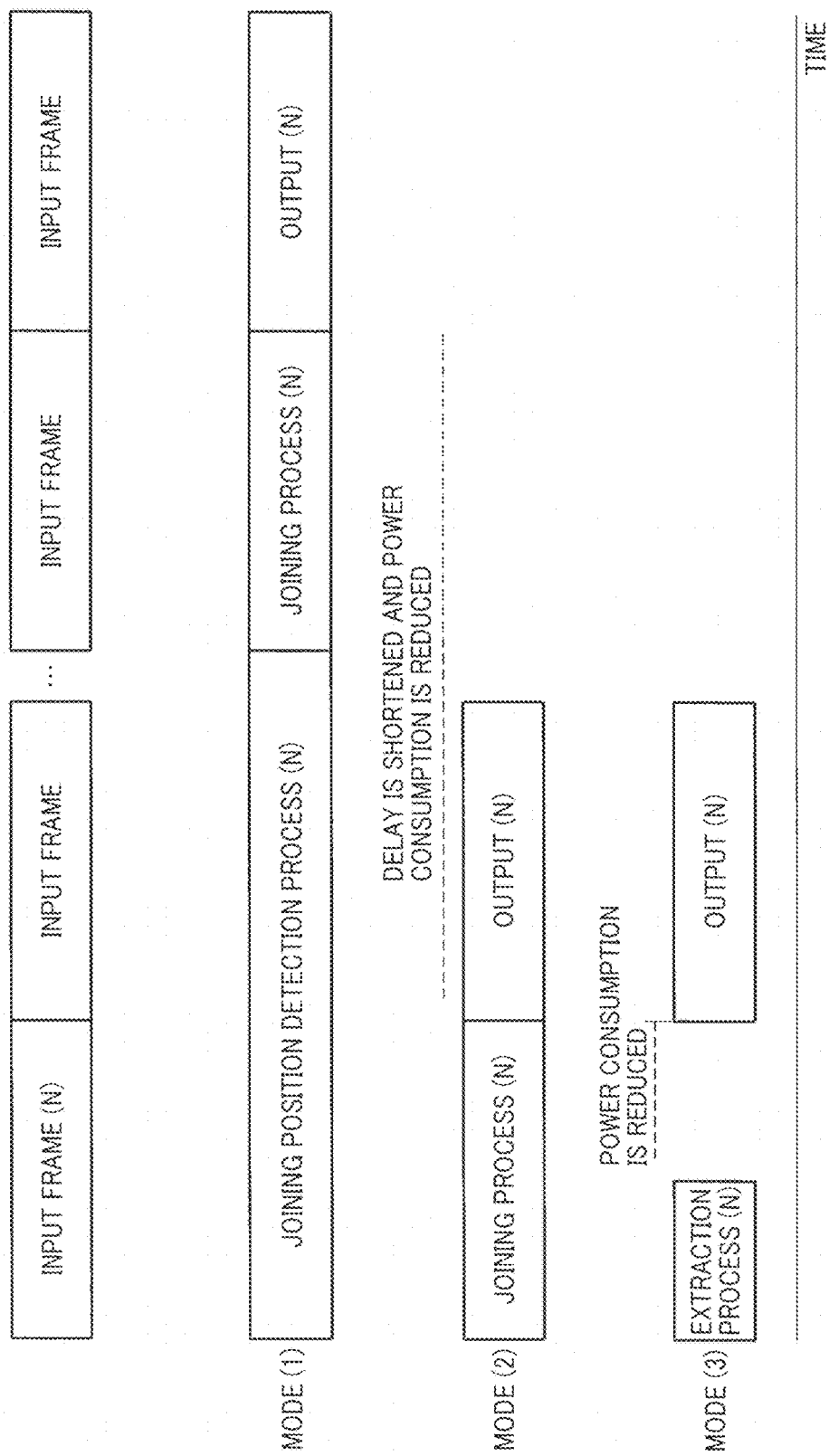

IMAGE PROCESSING SYSTEM, IMAGE GENERATION APPARATUS, AND IMAGE GENERATION METHOD

CROSS-REFERENCE TO RELATED APPLICATIONS

This patent application is based on and claims priority pursuant to 35 U.S.C. § 119(a) to Japanese Patent Application Nos. 2015-021783 and 2015-106010, filed on Feb. 6, 2015, and May 26, 2015, respectively, in the Japan Patent Office, the entire disclosure of which is hereby incorporated by reference herein.

BACKGROUND

Technical Field

Embodiments of the present invention relate to an image processing system, an image generation apparatus, and an image generation method.

Background Art

An omnidirectional imaging system that uses a plurality of wide-angle lenses such as fish-eye lenses and super-wide-angle lenses to capture an omnidirectional image at a time is known (hereinafter, such an omnidirectional image is referred to as a spherical image) (see, for example, JP-2013-187860-A). Such an omnidirectional imaging system projects images from multiple lenses on the sensor plane, and joins these images together by image processing. Accordingly, a spherical image is generated. For example, two wide-angle lenses that have angles of view of 180 degrees or wider may be used to generate a spherical image.

In the image processing of JP-2013-187860-A, distortion correction and projective transformation are performed on the fish-eye images captured by lens optical systems, based on a predetermined projection model and in view of the distortion with reference to an optimal model. Then, the fish-eye images are joined together based on the overlapping portions included in the fish-eye images, and a sheet of spherical image is generated. In the joining process of the images, joining positions where subjects overlap with each other in the overlapping portions among the fish-eye images are detected using pattern matching or the like.

SUMMARY

Embodiments of the present invention described herein provide an image processing system, an image generation apparatus, and an image generation method. The image processing system includes a switching unit configured to switch an operating mode of the image processing system between at least a first mode and a second mode, a detection unit configured to detect a joining position among a plurality of input images to generate a detection result, and a joining unit configured to join the plurality of input images to generate an output image. When the mode is switched to the first mode, the joining unit joins the plurality of input images based on the detection result of the detection unit to generate the output image. When the mode is switched to the second mode, the joining unit joins the plurality of input images to generate the output image, without causing the detection unit to generate the detection result. Each of the image generation apparatus and the image generation method includes determining whether or not to detect a joining position of a first image and a second image, and joining the first image and the second image at a prescribed position when the determining determines not to detect the joining position, to generate an image.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 4 is a diagram illustrating functional blocks related a spherical image monitoring function implemented on an omnidirectional imaging system, according to an embodiment of the present invention.

FIG. 10 is a diagram depicting the data structure of a joining-position detection result, according to an embodiment of the present invention.

FIG. 13 is a schematic diagram illustrating the reduction in the delay in displaying an image and the reduction in the power consumption, in an omnidirectional imaging system according to an embodiment of the present invention.

Figure 1:
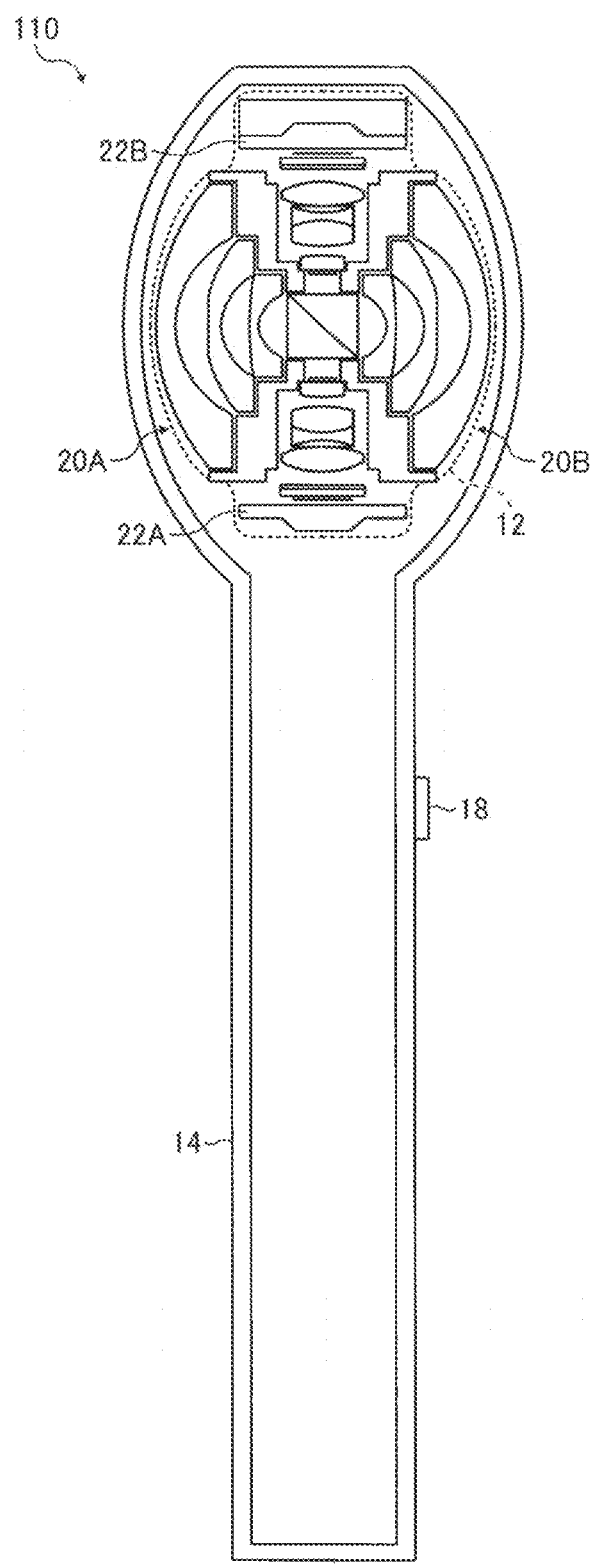
FIG. 1 is a sectional view of an omnidirectional camera of an omnidirectional imaging system according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Some embodiments of the present invention are described below, but no limitation is indicated therein and various applications and modifications may be made without departing from the scope of the invention. In the embodiments described below, as an example of an image processing system and imaging system, an omnidirectional imaging system 100 including an omnidirectional camera 110 provided with two fish-eye lenses, and a user terminal device 150 that communicates with the omnidirectional camera 110 is described. Note that in the embodiments described below, the number of the fish-eye lenses is two, but three or more fish-eye lenses may be used.

Hereinafter, the schematic configuration of the omnidirectional imaging system 100 according to the present embodiment is described with reference to FIG. 1, FIG. 2A, and FIG. 2B. FIG. 1 is a sectional view of the omnidirectional camera 110 of the omnidirectional imaging system 100 according to the present embodiment. The omnidirectional camera 110 illustrated in FIG. 1 includes an imaging body 12, a housing 14 holding the imaging body 12 and components such as a controller and a battery, and a shutter button 18 provided on the housing 14. The controller may be implemented by, for example, a processor such as a central processing unit and a memory.

The imaging body 12 illustrated in FIG. 1 includes two image forming optical systems 20A and 20B and two imaging elements 22A and 22B. Each of the imaging elements 22A and 22B may be, for example, a charge-coupled device (CCD) sensor or a complementary metal oxide semiconductor (CMOS) sensor. Each of the image forming optical systems 20 is configured as a fish-eye lens consisting of, for example, seven elements in six groups. In the embodiment illustrated in FIG. 1, the above-mentioned fish-eye lens has a full angle of view of larger than 180 degrees (=360 degrees/n, where n denotes the number of optical systems and n is 2), preferably has an angle of view of 190 degrees or larger. Such a wide-angle combination of one of the image forming optical systems 20 and one of the imaging elements 22 is referred to as a wide-angle imaging optical system.

The relative positions of the optical elements (lenses, prisms, filters, and aperture stops) of the two image forming optical systems 20A and 20B are determined with reference to the imaging elements 22A and 22B. More specifically, positioning is made such that the optical axis of the optical elements of each of the image forming optical systems 20A and 20B is positioned at the central part of the light receiving area of corresponding one of the imaging elements 22 orthogonally to the light receiving area, and such that the light receiving area serves as the imaging plane of corresponding one of the fish-eye lenses.

In the embodiment illustrated in FIG. 1, the image forming optical systems 20A and 20B have the same specifications, and are combined in directions reverse to each other such that the optical axes thereof coincide with each other. The imaging elements 22A and 22B convert the light distribution of the received light into an image signal, and sequentially output image frames to the image processing block of the controller. The image processing block may be an image processing circuit. As will be described later in detail, the images captured by the respective imaging elements 22A and 22B are combined so as to generate an image over a solid angle of 4π steradian (hereinafter, such an image is referred to as a "spherical image"). The spherical image is obtained by photographing all the directions viewable from a photographing location. While it is assumed in the example embodiment described below that a spherical image is to be generated, a so-called panoramic image obtained by photographing 360 degrees only in a horizontal plane or an image that is a part of the image obtained by photographing omnidirectionaly or 360 degrees in a horizontal plane may also be generated. The spherical image may be stored as a still image or as a video (moving images) in a memory.

Figure 2B:
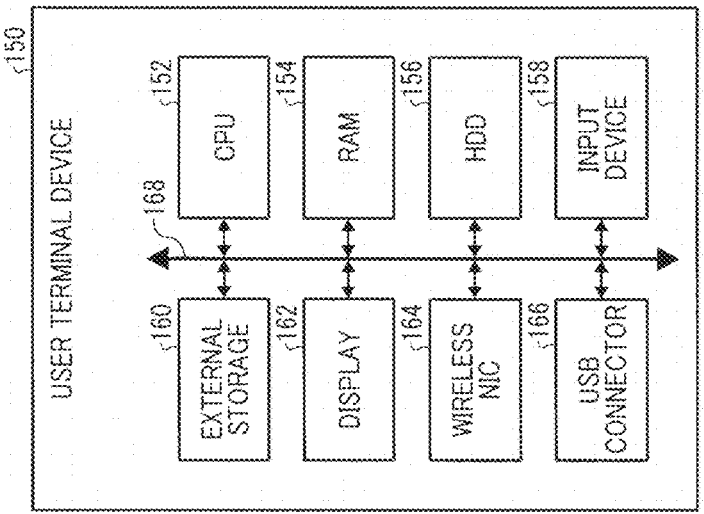
FIG. 2A and FIG. 2A and FIG. 2B are block diagrams of the hardware configuration of an omnidirectional imaging system according to an embodiment of the present invention.
Figure 2A:
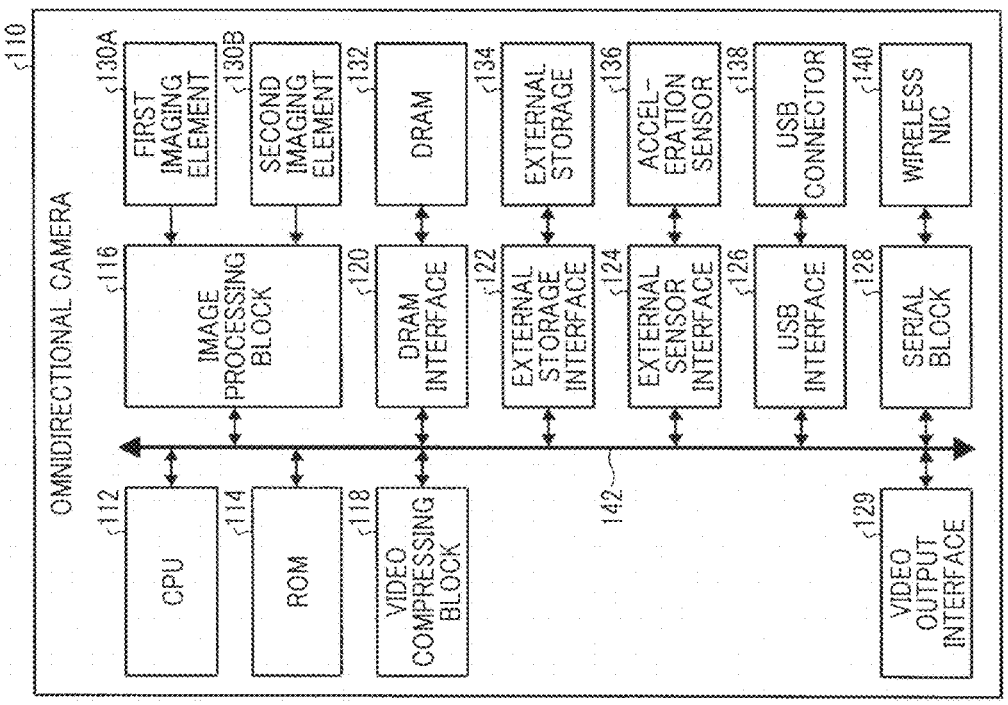

FIG. 2A is a block diagram of the hardware configuration of an omnidirectional camera 110 of an omnidirectional imaging system 100 according to the present embodiment. The omnidirectional camera 110 includes a central processing unit (CPU) 112, a read only memory (ROM) 114, an image processing block 116, a video compressing block 118, a dynamic random access memory (DRAM) 132 that is connected through a DRAM interface 120, and an acceleration sensor 136 that is connected through an external sensor interface 124.

The CPU 112 controls the operations of components of the omnidirectional camera 110, or controls the overall operations of the omnidirectional camera 110. The ROM 114 stores therein a control program described in a code readable by the CPU 112 and various kinds of parameters. The image processing block 116, which may be implemented by the image processing circuit, is connected to two imaging elements 130A and 130B (corresponding to the imaging elements 22A and 22B in FIG. 1), and receives image signals of images captured by the respective imaging elements 130A and 130B. The image processing block 116 includes, for example, an image signal processor (ISP), and applies, for example, shading correction, Bayer interpolation, white balance correction, and gamma correction to the image signals received from the imaging elements 130A and 130B. Further, the image processing block 116 combines a plurality of images obtained from the imaging elements 130A and 130B to generate a spherical image as described above.

The video compressing block 118 is a codec block for compressing and expanding a video such as that in MPEG-4 AVC/H.264 format. The video compressing block 118 is used to generate the video data of the generated spherical image. The DRAM 132 provides a storage area for temporarily storing data therein when various types of signal processing and image processing are applied. The acceleration sensor 136 detects acceleration components along three axes. The detected acceleration components are used for detecting the vertical direction to apply zenith correction to the spherical image.

The omnidirectional camera 110 further includes an external storage interface 122, a universal serial bus (USB) interface 126, a serial block 128, and a video output interface 129. The external storage interface 122 is connected to an external storage 134. The external storage interface 122 controls reading and writing to an external storage 134, such as a memory card inserted in a memory card slot. While FIG. 2 shows that the external storage 132 is provided internally for simplicity, the external storage 132 is implemented as any desired removable memory.

The USB interface 126 is connected to a USB connector 138. The USB interface 126 controls USB communication with an external device such as a personal computer (PC) connected via the USB connector 138. The serial block 128 controls serial communication with an external device such as a PC, and is connected to a wireless network interface card (NIC) 140. The video output interface 129 is an interface to connect to an external display such as a high-definition multimedia interface (HDMI®), and can output the captured images to such an external display as a video.

When the power is turned on by the operation of a power switch, the control program mentioned above is loaded into the main memory. The CPU 112 follows the program read into the main memory to control the operations of the parts of the device, and temporarily stores the data required for the control in the memory. This operation implements functional units and processes of the omnidirectional camera 110, as will be described later.

FIG. 2B is a block diagram of the hardware configuration of a user terminal device 150 of the omnidirectional imaging system 100 according to the present embodiment. The user terminal device 150 illustrated in FIG. 2B includes a CPU 152, a random access memory (RAM) 154, and hard disk drive (HDD) 156, an input device 158, an external storage 160, a display 162, a wireless NIC 164, and a USB connector 166.

The CPU 152 controls the operations of components of the user terminal device 150, or controls the overall operations of the user terminal device 150. The RANI 154 provides the work area of the CPU 152. The HDD 156 stores therein an operating system and a control program, such as an application, that executes processes in the user terminal device 150 according to the present embodiment, each of the operating system and the control program being written in a code decodable by the CPU 152.

The input devices 158 are input devices, such as a mouse, a keyboard, a touchpad, and a touchscreen, and provide a user interface. The external storage 160 is a removable recording medium mounted, for example, in a memory card slot, and records various types of data, such as image data in a video format and still image data. The wireless NIC 164 establishes a connection for wireless LAN communication with an external device such as the omnidirectional camera 110. The USB connector 166 provides a USB connection to an external device such as the omnidirectional camera 110. By way of example, the wireless NIC 164 and the USB connector 166 are described. However, limitation to any specific standard is not intended, and connection to an external device may be established through another wireless connection such as Bluetooth (registered trademark) and wireless USB or through a wired connection such as wired local area network (LAN).

The display 162 performs the display of an operation screen, the display of the monitor image of the image captured by the omnidirectional camera 110 that is ready to capture or is capturing an image, and the display of the stored video or still image for reproducing or viewing. The display 162 and the input device 158 enable, through the operation screen, making instructions for image capturing or changing various kinds of setting in the omnidirectional camera 110.

When power is supplied to the user terminal device 150 and the power thereof is turned on, the program is read from a ROM or the HDD 156, and loaded into the RANI 154. The CPU 152 follows the program read into the RAM 154 to control the operations of the parts of the device, and temporarily stores the data required for the control in the memory. This operation implements functional units and processes of the user terminal device 150, as will be described later.

As described above, the omnidirectional camera 110 according to the present embodiment is used to capture a still image of a spherical image or record the video of a spherical image. It is desired that the state of a still image or video of a spherical image can be checked in real time when it is ready to capture such a still image or video or when such a still image or video is being captured. For example, when the omnidirectional camera 110 is to be set, the brightness of an image or the angle of view may be checked.

However, in order for the multiple imaging elements 130A and 130B to generate a spherical image as described above, complicated image processing is required such as the detection of joining positions where subjects overlap with each other using pattern matching or the like and the joining of the multiple images. If the image processing as described above can be performed at high speed, a spherical image can be monitored in real time. However, in actuality, a large amount of image processing is required as described above, and it is difficult to achieve the monitoring of an image in real time at limited cost. Even if high-speed image processing is achieved, the power consumption due to the image processing is likely to increase, and the consumption of the battery may become excessive and the amount of heat generation may increase.

In order to avoid such situation, in the present embodiment, several image processing paths according to multiple modes are prepared to deal with various uses. One of the multiple modes is a (1) capture mode in which the joining process of the images input from the imaging elements 130A and 130B is performed in view of the results of the detection process of joining positions to generate an output image. Another one of the multiple mode is a (2) angle-of-view check mode with the following features. When the (2) angle-of-view check mode is selected from the multiple modes, the detection process of joining positions as described above is bypassed, and the joining process of the images input from the imaging elements 130A and 130B is directly performed to generate an output image. In other words, in the (2) angle-of-view check mode, joining positions are not detected, and first and second images, i.e., the images input from the imaging elements 130A and 130B, are joined together at a prescribed position to generate an output image. In an alternative embodiment, a (3) brightness check mode in which at least one of the multiple input images is extracted to generate an output image is further provided. In other words, in the (3) brightness check mode, a partial-view image is extracted without the detection of a joining position.

According to the configuration as described above, when it is desired that angle of view be checked, the (2) angle-of-view check mode is selected. By so doing, an output image can be generated with bypassing the joining position detection process where the processing load and the power consumption are large. Accordingly, the delay in generating an image in the is shortened in angle-of-view check, and the power consumption and the generation of heat are reduced.

In the embodiments described below, the user terminal device 150 is used to display a monitor image for checking a to-be-captured-image or being-captured-image of a still image or video of an omnidirectional image when it is ready to capture such a still image or video or when such a still image or video is being captured. The application for remote control that is running on the user terminal device 150 is operated to make instructions for image capturing while displaying a monitor image on the user terminal device 150. In response to the instructions made through the user terminal device 150, the omnidirectional camera 110 captures a still image or video. However, no limitation is intended thereby. In other embodiments, a monitor image may be displayed on an external display connected to the video output interface 129, or a monitor image may be displayed on the display provided for the omnidirectional camera 110 when the omnidirectional camera 110 is provided with a display. Alternatively, instructions for image capturing may be made through the shutter button 18.

Figure 3:
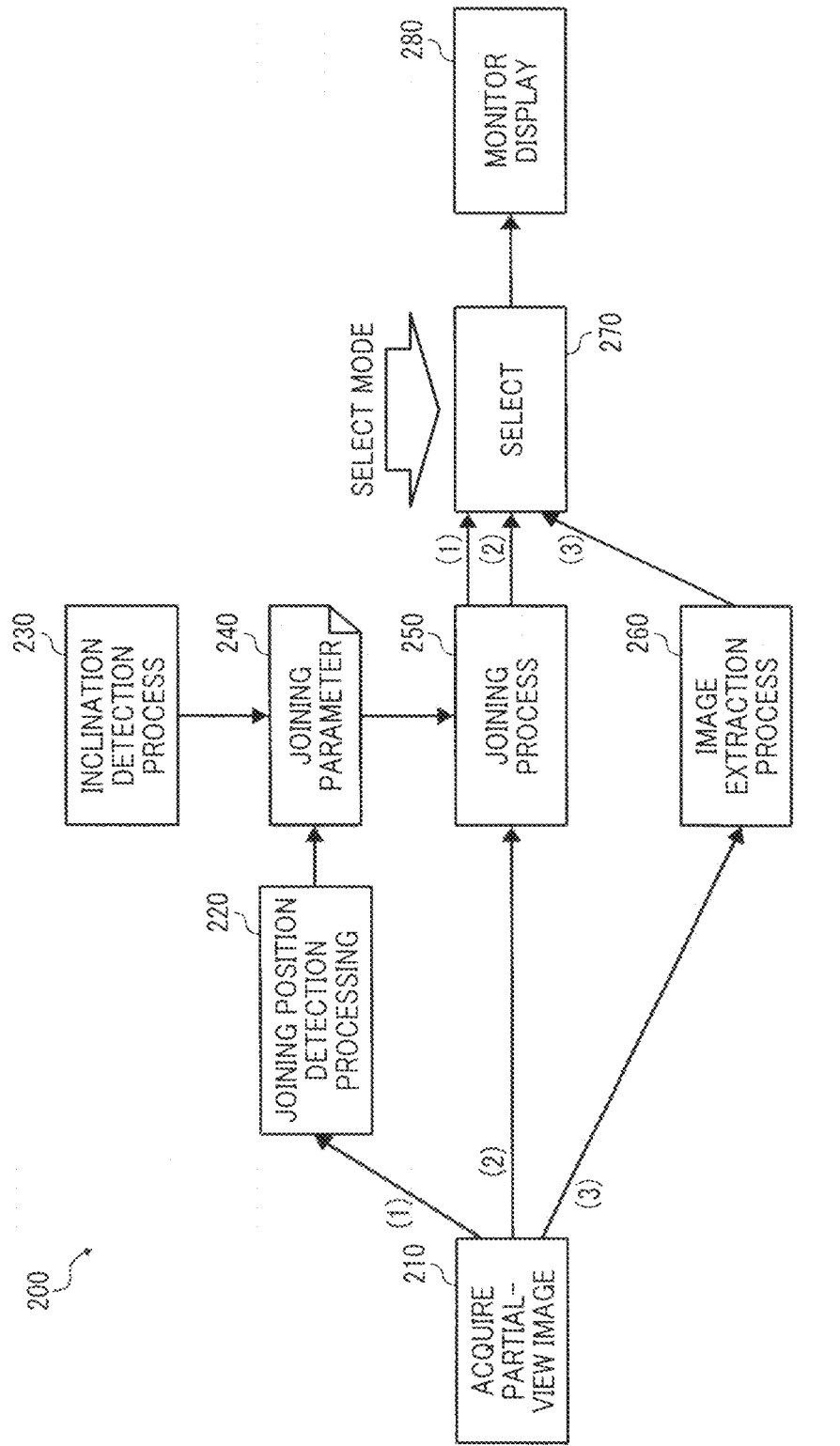
FIG. 3 is a schematic block diagram illustrating the flow of image processing for each one of a plurality of modes in an omnidirectional imaging system according to an embodiment of the present invention.

Hereinafter, the flow of the image processing of a plurality of modes in the omnidirectional imaging system 100 according to the present embodiment is described with reference to FIG. 3. FIG. 3 is a schematic block diagram of the image processing path of a plurality of modes in the omnidirectional imaging system 100, according to the present embodiment.

FIG. 3 illustrates the flows of the image processing of the three modes including the (1) capture mode, the (2) angle-of-view check mode, and the (3) brightness check mode. In all the modes, image processing 200 starts from a partial-view image acquisition process 210 performed by the multiple imaging elements 130A and 130B. In the partial-view image acquisition process 210, the omnidirectional camera 110 controls the two imaging elements 130A and 130B to capture continuous frames in sequence. Each of the images captured by the imaging elements 130A and 130B is a fish-eye image that roughly covers a hemisphere of the whole sphere as a field of view, configures a partial-view image of the omnidirectional image. Hereinafter, each frame of the images captured by the imaging elements 130A and 130B is referred to as a partial-view image.

Firstly, the (1) capture mode is described. In the (1) capture mode, after the partial-view image acquisition process 210, the omnidirectional camera 110 performs a joining position detection process 220 to detect the joining position of the obtained two partial-view images. In the joining position detection process 220 of the (1) capture mode, the amount of displacement among a plurality of corresponding points in an overlapping area of the multiple partial-view images is detected for each frame to generate a joining-position detection result.

In the (1) capture mode, an inclination detection process 230 is performed subsequent to the joining position detection process 220. In the inclination detection process 230, the omnidirectional camera 110 controls the acceleration sensor 136 depicted in FIG. 2A to detect an inclination of the omnidirectional camera 110 with reference to a prescribed reference direction. Typically, the prescribed reference direction refers to a vertical direction in which the acceleration of gravity is applied. In the inclination detection process 230, for each frame, the acceleration sensor 136 measures the acceleration components along three axes, and an inclination detection result is generated.

The joining-position detection result and the inclination detection result as described above that are obtained in the joining position detection process 220 and the inclination detection process 230, respectively, configure a joining parameter 240 for combining a plurality of partial-view images of each frame.

In the (1) capture mode, the omnidirectional camera 110 subsequently performs a joining process 250 to join two partial-view images obtained in the partial-view image acquisition process 210 based on the obtained joining parameter 240. In the joining process 250 of the (1) capture mode, a plurality of partial-view images are aligned at the joining positions that are based on the joining-position detection result, and zenith correction is performed based on the inclination detection result. Accordingly, the two partial-view images that are obtained in the partial-view image acquisition process 210 are combined with each other to generate a spherical image (omnidirectional image). However, no limitation is indicated thereby, and three or more fish-eye lenses may be used to combine three or more partial-view images to generate a spherical image.

In the (1) capture mode, the joining position and the inclination are detected for each frame, and thus the joining parameter 240 is dynamically updated for each frame. Then, the joining process 250 is performed for each frame in view of the joining parameter 240 into which the detection results are incorporated. Accordingly, even when the inclination or direction of the omnidirectional camera 110 changes or the object near the overlapping area moves in the (1) capture mode, an output image in which zenith correction and joining-position correction have appropriately been made can be generated.

By contrast, in the (2) angle-of-view check mode, the omnidirectional camera 110 bypasses the joining position detection process 220 after the partial-view image acquisition process 210, and performs the joining process 250. In other words, in the (2) angle-of-view check mode, joining positions are not detected, and first and second images, i.e., the images input from the imaging elements 130A and 130B, are joined together at a prescribed position to generate an output image. In the joining process 250 of the (2) angle-of-view check mode, a plurality of partial-view images are aligned at the joining positions that are based on a predetermined joining parameter, and the obtained two partial-view images are combined. As a result, a spherical image (omnidirectional image) is generated. However, no limitation is indicated thereby, and three or more fish-eye lenses may be used to combine three or more partial-view images to generate a spherical image.

The predetermined joining parameter includes, for example, a parameter that is generated for calibration in advance of shipment of the omnidirectional camera 110, and a parameter that is generated in the previous capturing in the capture mode. In other words, at least, a parameter that exists before the partial-view images are captured is used as a predetermined joining parameter in a static manner. Accordingly, the detection of the joining position and inclination for each image frame is omitted, and the delay in displaying an image can be shortened when an output image is generated and the power consumption can be reduced. As the predetermined joining parameter is a parameter that has successfully been used to perform joining appropriately in the past, such a parameter does not significantly misalign the joining position, and sufficient image quality can be achieved to check angle of view.

Further, in the (3) brightness check mode, the omnidirectional camera 110 bypasses the joining position detection process 220 and the joining process 250 after the partial-view image acquisition process 210, and performs an image extraction process 260. In the image extraction process 260, a portion of at least one of the multiple partial-view images obtained in the partial-view image acquisition process 210 is extracted to generate an output image. The processing load of the image extraction process 260 is further smaller than that of the joining process 250. Accordingly, the power consumption can further be reduced. In other words, in the (3) brightness check mode, a partial-view image is extracted without the detection of a joining position.

After the completion of the joining process 250 or the image extraction process 260 in one of the modes (1) to (3), the omnidirectional camera 110 performs a selection process 270 for an output image, and the user terminal device 150 performs a monitor displaying process 280 based on the image output from the omnidirectional camera 110.

In the selection process 270, the image processing path is switched according to the selected mode among the multiple modes. In the selection process 270 of the (1) capture mode, the omnidirectional camera 110 selects a spherical image (omnidirectional image) in which the joining position and the zenith are corrected in the joining process 250. By contrast, in the selection process 270 of the (2) angle-of-view check mode, the omnidirectional camera 110 selects a spherical image (omnidirectional image) in which the joining position and the zenith are not corrected in the joining process 250. In the selection process 270 of the (3) brightness check mode, the omnidirectional camera 110 selects the extracted image extracted in the image extraction process 260.

In the monitor displaying process 280, the user terminal device 150 displays a monitor image based on the output image that is switched according to the selected mode. Note that in the monitor displaying process 280 of the (1) capture mode and the (2) angle-of-view check mode, a spherical image may be displayed just as it is or an image that is generated by projecting a spherical image with a prescribed angle of view (i.e., an image extracted from a spherical image with a prescribed angle of view) may be displayed. In the (3) brightness check mode, an extracted image can be displayed just as it is in the monitor displaying process 280.

Hereinafter, the spherical image monitoring function of the omnidirectional imaging system 100 according to the present embodiment is described in detail with reference to FIG. 4 to FIG. 13. FIG. 4 is a diagram illustrating functional blocks implemented on the omnidirectional imaging system 100, according to the present embodiment. As illustrated in FIG. 4, the image processing block 300 according to the present embodiment includes a position-detecting distortion correction unit 302, a joining position detection unit 304, a table correction unit 306, a table generation unit 308, an inclination detection unit 310, an image-combining distortion correction unit 312, an image combining unit 314, an image extraction unit 316, a mode switching unit 318, and an output image selection unit 320.

To the image processing block 300, two partial-view images that have gone through various kinds of image signal processing are input from the two imaging elements 130A and 130B for each frame. Here, the image frame derived from the imaging element 130A as a source is referred to as a "partial-view image 0", and the image frame derived from the imaging element 130B as a source is referred to as a "partial-view image 1". In the image processing block 300, a position-detecting conversion table 330 is further provided that is generated in advance by the manufacturer or the like according to a prescribed projection model and the design data or the like of each of the lens optical systems.

In the (1) capturing mode, the position-detecting distortion correction unit 302, the joining position detection unit 304, the table correction unit 306, the table generation unit 308, and the inclination detection unit 310 operate to generate the joining parameter 240.

The position-detecting distortion correction unit 302 corrects the distortion of the input partial-view images 0 and 1 using the position-detecting conversion table 330, and generates a corrected image for position detection (hereinafter, such an image may be referred to simply as a corrected image) 0 and a corrected image for position detection 1. The input partial-view images 0 and 1 are image data that is expressed by a planar coordinate system (x, y). By contrast, the corrected images where the distortion is corrected using the position-detecting conversion table 330 is image data in an omnidirectional image format expressed by a spherical coordinate system (i.e., a polar coordinate system having the radius vector of 1 and two angles of deviation $\theta$ and $\varphi$).

Figure 5A:
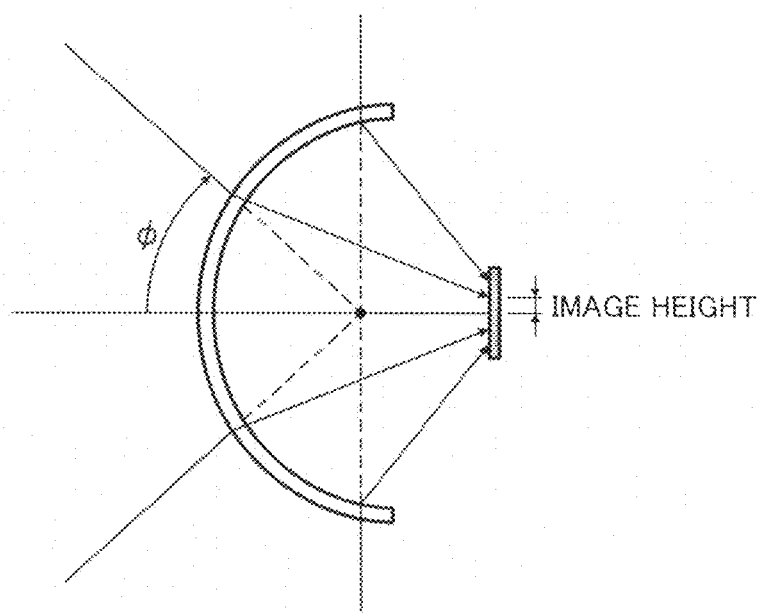
FIG. 5A and FIG. 5B are diagrams illustrating a projection relation in an omnidirectional imaging system, according to an embodiment of the present invention.
Figure 5B:
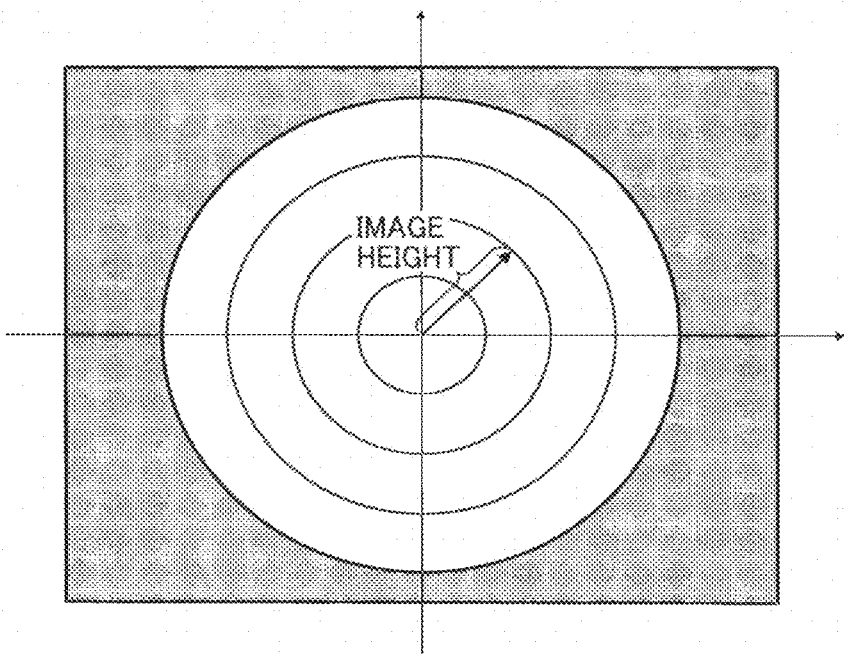

FIG. 5A and FIG. 5B are diagrams illustrating a projection relation in the omnidirectional imaging system 100, according to the present embodiment. In the present embodiment, an image captured by one fish-eye lens is an image obtained by capturing an orientation range of substantially a hemisphere with reference to a photographing location. As illustrated in FIG. 5A, the fish-eye lens generates an image having an image height h that corresponds to an angle of incidence $\varphi$ with reference to the optical axis. The relation between the image height h and the angle of incidence $\varphi$ is determined by a projection function according to a prescribed projection model. In the example embodiment described below, the configuration of a so-called circular fish-eye lens that has an image circle diameter shorter than a diagonal line of the image is adopted. As illustrated in FIG. 5B, the partial-view image obtained from the lens is a planar image including the entire image circle obtained by projecting the captured range of substantially a hemisphere.

Figure 6A:
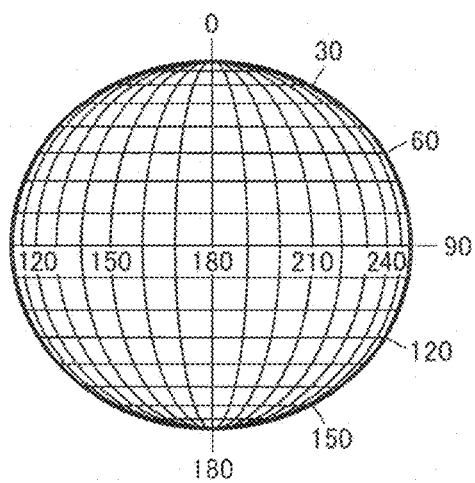
FIG. 6A and FIG. 6B are diagrams illustrating the data structure of image data in an omnidirectional image format, according to an embodiment of the present invention.
Figure 6B:
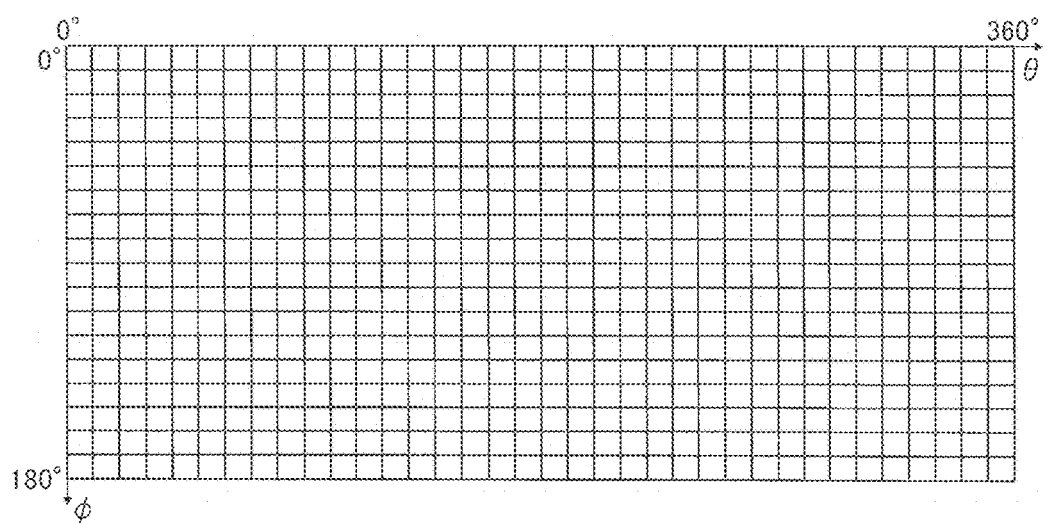

FIG. 6A and FIG. 6B are diagrams illustrating the data structure of image data in an omnidirectional image format according to the present embodiment. As illustrated in FIG. 6A and FIG. 6B, the image data in an omnidirectional image format is expressed as an array of pixel values where the vertical angle $\varphi$ corresponding to the angle with reference to a certain axis and the horizontal angle $\theta$ corresponding to the angle of rotation around the axis are the coordinates. The coordinate values ($\theta$, $\varphi$) are associated with the points on the spherical surface indicating all directions around the photographing location, and the all directions are mapped on the spherical image (omnidirectional image).

Figures 7A, 7B:
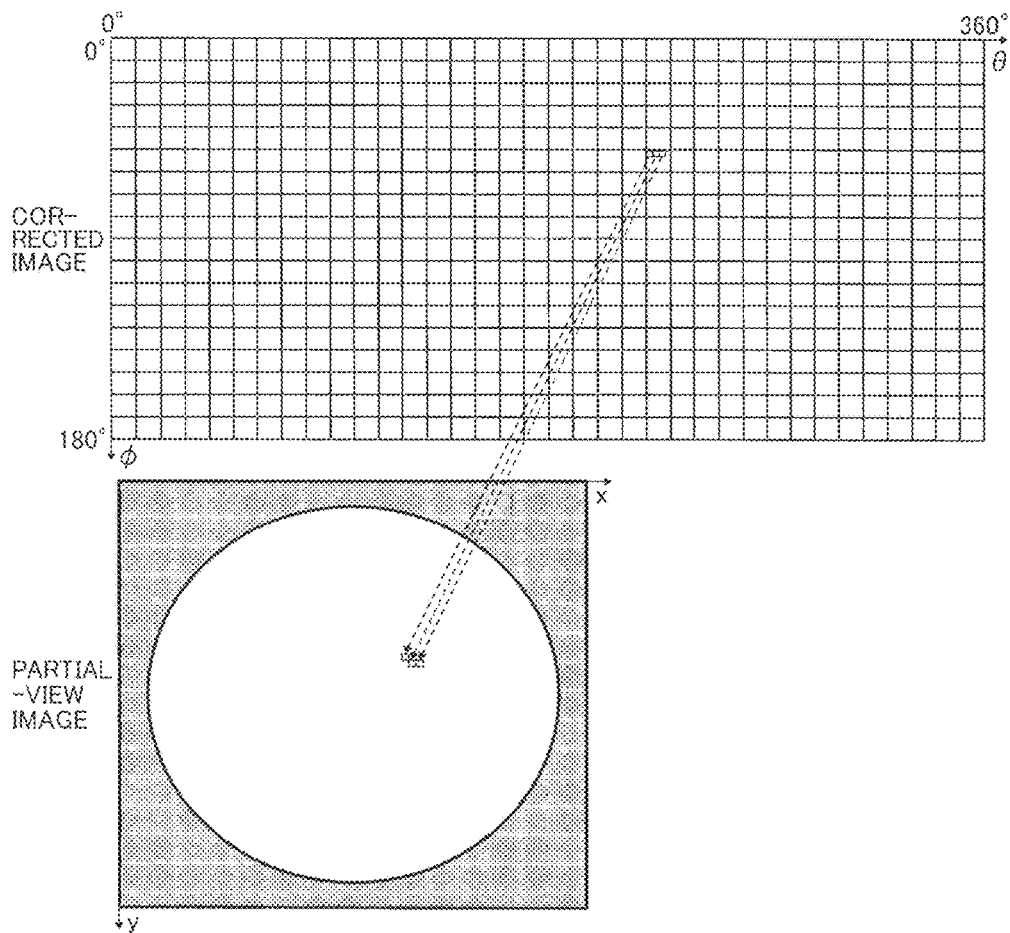
FIG. 7A and FIG. 7B are diagrams illustrating the conversion data that a position-detecting distortion correction unit refers to, according to an embodiment of the present invention.

FIG. 7A and FIG. 7B are diagrams illustrating the conversion data that the position-detecting distortion correction unit 302 refers to, according to the present embodiment. The position-detecting conversion table 330 provides for the projection of partial-view images expressed in a planar coordinate system as an image expressed in a spherical coordinate system. As illustrated in FIG. 7A and FIG. 7B, for each fish-eye lens, the position-detecting conversion table 330 provides for the associating information between the coordinate values ($\theta$, $\varphi$) of the post-correction images and the coordinate values (x, y) of the pre-correction partial-view images that are mapped on the coordinate values ($\theta$, $\varphi$), for all the coordinate values ($\theta$, $\varphi$). In the illustration of FIG. 7A and FIG. 7B, the angle of each one of the pixels is one-tenths of a degree in both $\varphi$ direction and $\theta$ direction, and the position-detecting conversion table 330 includes the data indicating the 3600×1800 corresponding relation for each fish-eye lens. The position-detecting conversion table 330 that is used for the joining position detection is created by calculating and tabulating the value upon correcting the distortion from an optimal lens model in advance by a manufacturer or the like.

Figure 8:
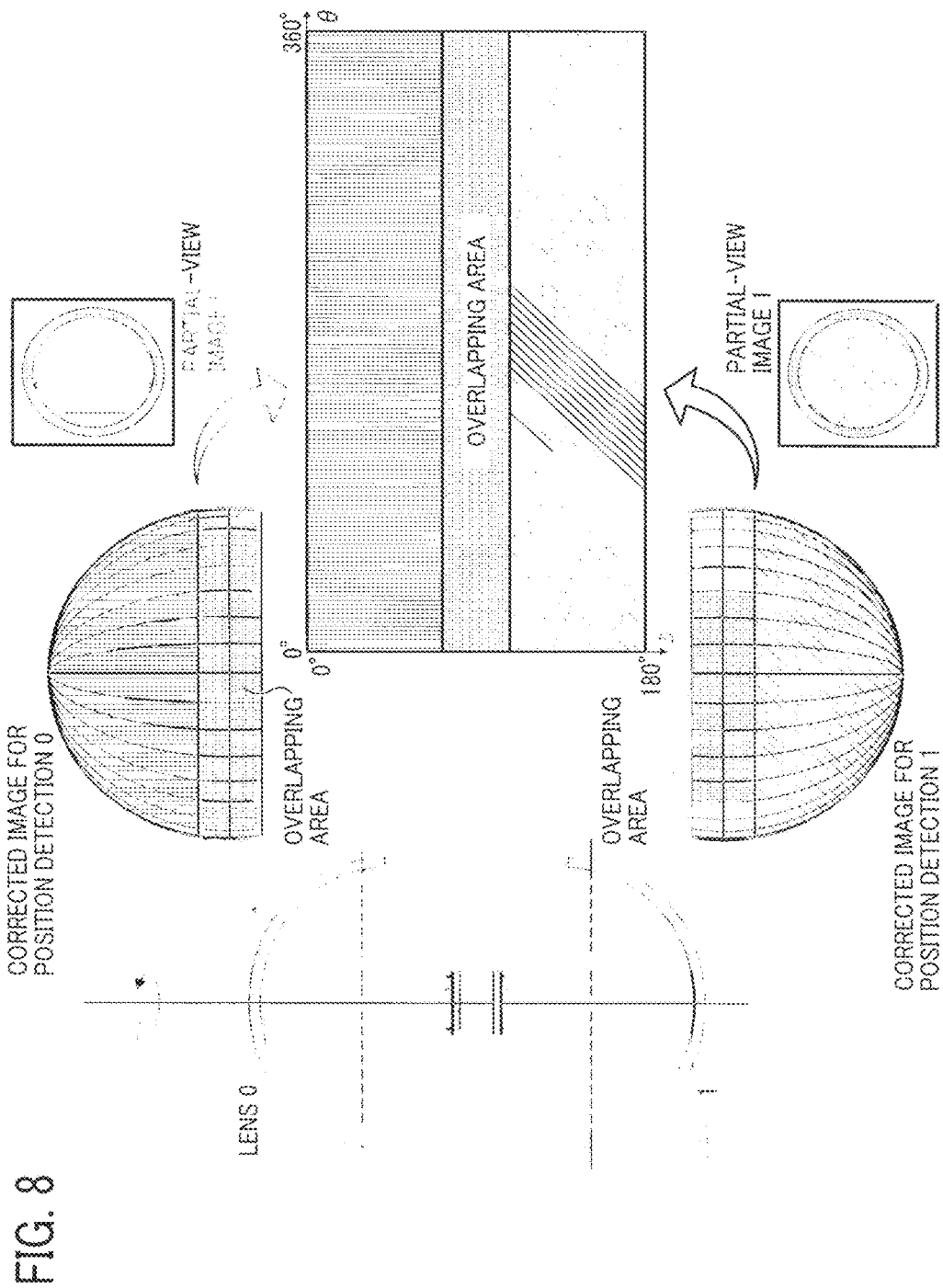
FIG. 8 is a diagram illustrating the mapping of the partial-view images captured by fish-eye lenses on a spherical coordinate system in the position-detecting process, according to an embodiment of the present invention.

FIG. 8 is a diagram illustrating the mapping of the partial-view images captured by fish-eye lenses on the spherical coordinate system in the position-detecting process, according to the present embodiment. As the result of the process performed by the position-detecting distortion correction unit 302, as illustrated in FIG. 8, the two partial-view images 0 and 1 that are captured by the fish-eye lenses are developed in an omnidirectional image format. Typically, the partial-view image 0 that is captured by the fish-eye lens 0 is approximately mapped on an upper hemisphere of the whole sphere, and the partial-view image 1 that is captured by the fish-eye lens 1 is approximately mapped on a lower hemisphere of the whole sphere. As the full angles of view of the fish-eye lenses exceed 180 degrees, each of the corrected image 0 and the corrected image 1 that are expressed in an omnidirectional image format lies off the hemisphere. For this reason, when the corrected image 0 and the corrected image 1 are superimposed on top of one another, an overlapping area occurs in which the captured ranges of these two images overlap with each other.

The joining position detection unit 304 performs pattern matching to detect the joining position between the corrected image 0 and corrected image 1 upon receiving the corrected image 0 and corrected image 1 converted by the position-detecting distortion correction unit 302, and generates the joining-position detection result 332. The position-detecting conversion table 330 according to the present embodiment is generated such that, as illustrated in FIG. 8, the optical axes of the two lens optical systems are projected onto the two poles of the spherical surface and the overlapping area between the two images is projected near the equator of the spherical surface. In the spherical coordinate system, the distortion increases as the coordinate is in closer proximity to the pole where the vertical angle $\varphi$ is 0 degree or 180 degrees, and the accuracy of the joining position detection deteriorates. By contrast, in the present embodiment where the projection is controlled as described above, the accuracy of the joining position detection can be improved. In FIG. 8, the two partial-view images that are captured by the two fish-eye lenses are mapped on the spherical coordinate system. However, no limitation is indicated thereby, and three or more fish-eye lenses may be used.

Figure 9:
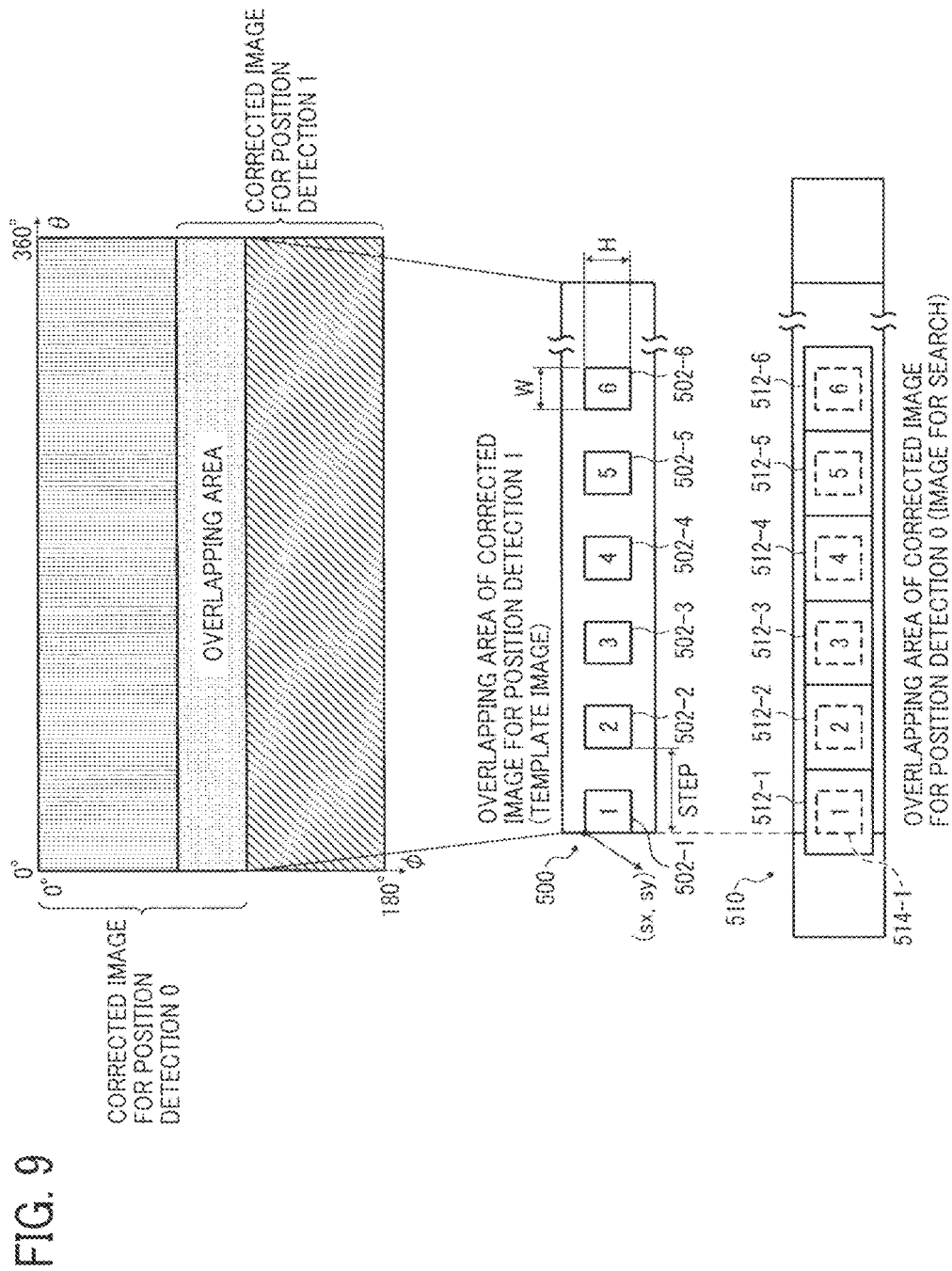
FIG. 9 is a diagram illustrating a joining position detection process according to an embodiment of the present invention.

FIG. 9 is a diagram illustrating the joining position detection process according to the present embodiment. In the present embodiment, a template image 500 corresponds to the overlapping area of the corrected image for position detection 1, and an image for search 510 corresponds to the overlapping area of the corrected image for position detection 0. Here, it is assumed that template images are generated with a prescribed size W and at prescribed intervals (steps), and as illustrated in FIG. 9, a plurality of template images 502-1 to 502-# are generated.

Then, template matching is performed on the generated template images 502-1 to 502-# to search a prescribed search area 512 for corresponding portions 514 on the image for search 510. For each of the template images 502-1 to 502-#, the amount of the shifting from a reference position at a position where the matching score becomes maximum is detected.

FIG. 10 is a diagram depicting the data structure of a joining-position detection result according to the present embodiment. As illustrated in FIG. 10, data in which the post-conversion coordinate values $(\theta, \varphi)$ associated with the amounts of shifting $(\Delta\theta, \Delta\varphi)$ are listed for all the coordinate values is generated based on the joining position detection process. In so doing, the amount of displacement $(\Delta\theta i, \Delta\varphi i)$ for each template block, which is calculated in the joining position detection as described above, is set as the values of the center coordinates of the template block, and the amount of displacement $(\Delta\theta, \Delta\varphi)$ that corresponds to each of the coordinate values $(\theta, \varphi)$ is interpolated. Accordingly, joining-position data is obtained.

The table correction unit 306 corrects the prepared position-detecting conversion table 330 based on the joining-position detection result 332, and passes the corrected position-detecting conversion table 330 to the table generation unit 308. Due to the joining position detection as described above, as illustrated in FIG. 10, the amount of misalignment is obtained for each of the coordinate values in an omnidirectional image format. Accordingly, the table correction unit 306 makes a correction such that, in a for-detection distortion-correction table 0 used to correct the distortion on the partial-view image 0, the input coordinate values $(\theta, \varphi)$ are associated with the coordinate values $(x, y)$ that were associated with the coordinate values $(\theta+\Delta\theta, \varphi+\Delta\varphi)$ before the correction. Note that in a for-detection distortion-correction table 1 used to correct the distortion on the partial-view image 1, it is not necessary to make a correction to change the associating relation.

The table generation unit 308 generates an image-combining conversion table 336 according to the rotational coordinate transformation and the post-conversion data corrected by the table correction unit 306. In so doing, the table generation unit 308 can generate the image-combining conversion table 336 in view of the inclination correction based on the inclination detection result 334 generated by the inclination detection unit 310.

As described above, in the (1) capture mode, the joining position is detected for each frame, and the image-combining conversion table 336 is updated. The processes that are performed by the position-detecting distortion correction unit 302, the joining position detection unit 304, the table correction unit 306, and the table generation unit 308 correspond to the joining position detection process 220 depicted in FIG. 3, and the processes that are performed by the inclination detection unit 310 correspond to the inclination detection process 230. The generated image-combining conversion table 336 corresponds to the joining parameter 240.

In the (2) angle-of-view check mode, it is desired that the position-detecting distortion correction unit 302, the joining position detection unit 304, the table correction unit 306, the table generation unit 308, and the inclination detection unit 310 as described above be placed into their inactive states to reduce the power consumption.

In the (1) capture mode and the (2) angle-of-view check mode, the image-combining distortion correction unit 312 and the image combining unit 314 operate to generate an omnidirectional image.

As a preliminary process prior to the image-combining process, the image-combining distortion correction unit 312 performs distortion correction on the partial-view image 0 and the partial-view image 1 using the conversion table, and generates a corrected image for image combination 0 and a corrected image for image combination 1. In a similar manner to the corrected image for position detection, the generated corrected image for image combination 0 and corrected image for image combination 1 are expressed as a spherical coordinate system, but the definition of the coordinate axis in the generated corrected image for image combination 0 and corrected image for image combination 1 is different from that of the corrected image for position detection due to the rotational coordinate transformation. The image combining unit 314 combines the obtained corrected image for image combination 0 and corrected image for image combination 1 to generate a frame for the combined image in an omnidirectional image format.

Figure 11:
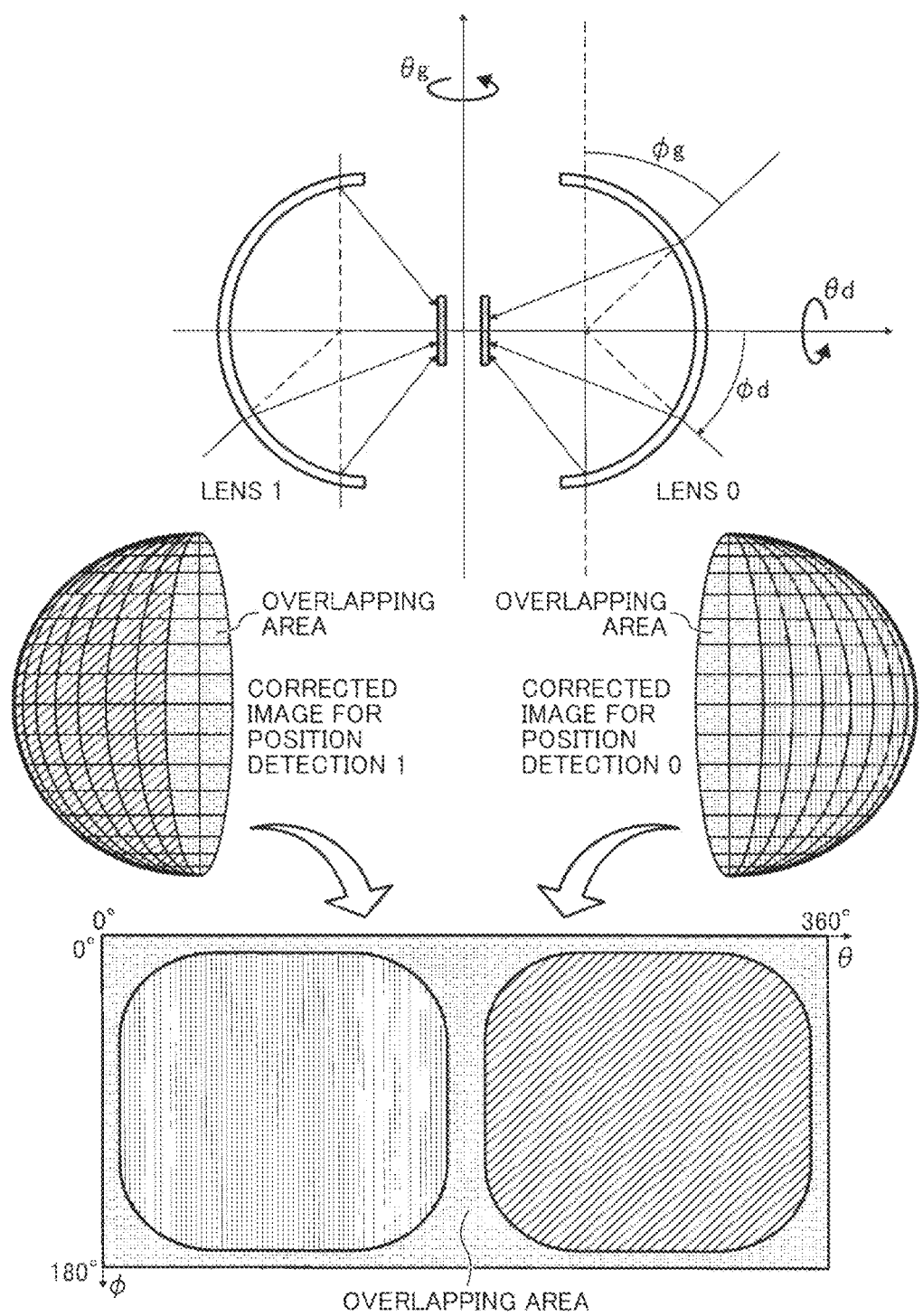
FIG. 11 is a diagram illustrating the mapping of the partial-view images captured by fish-eye lenses on a spherical coordinate system in the image-combining process, according to an embodiment of the present invention.

FIG. 11 is a diagram illustrating the mapping of the partial-view images captured by fish-eye lenses on the spherical coordinate system in the image-combining process, according to the present embodiment. Due to the rotational coordinate transformation as described above, the definition of the coordinates of the horizontal angle and vertical angle with reference to the optical axis of one of the lens optical systems, as illustrated in FIG. 8, is converted into the definition of the coordinates of the horizontal angle and vertical angle with reference to the axis perpendicular to the optical system, as illustrated in FIG. 11. Accordingly, as a result of the process performed by the image-combining distortion correction unit 312, as illustrated in FIG. 11, the two partial-view images 0 and 1 that are captured by the fish-eye lenses are developed in an omnidirectional image format. Typically, the partial-view image 0 that is captured by the fish-eye lens 0 is approximately mapped on a left hemisphere of the whole sphere, and the partial-view image 1 that is captured by the fish-eye lens 1 is approximately mapped on a right hemisphere of the whole sphere. In FIG. 11, the two partial-view images that are captured by the two fish-eye lenses are mapped on the spherical coordinate system. However, no limitation is indicated thereby, and three or more fish-eye lenses may be used to combine three or more partial-view images to generate a spherical image.

The conversion table that is referred to by the image-combining distortion correction unit 312 varies according to the selected mode. In the (1) capture mode, the image-combining conversion table 336 that is updated in the joining position detection process 220 for each frame is referred to. By contrast, in the (2) angle-of-view check mode, the fixed conversion table 338 is referred to through all the frames. Here, the fixed conversion table 338 may be, for example, a table stored in advance by a manufacturer or the like, or a table created in the previous (1) capture mode. In other words, in the (2) angle-of-view check mode, the fixed conversion table 338 with which a spherical image (omnidirectional image) can be generated with allowable quality is used although the fixed conversion table 338 is not a conversion table that is optimized for the captured frame at that point in time.

As described above, in the (1) capture mode and the (2) angle-of-view check mode, the joining process is performed based on the conversion tables 336 and 338. The processes that are performed by the image-combining distortion correction unit 312 and the image combining unit 314 correspond to the joining process 250 depicted in FIG. 3.

In the (3) brightness check mode, the position-detecting distortion correction unit 302, the joining position detection unit 304, the table correction unit 306, the table generation unit 308, the inclination detection unit 310, the image-combining distortion correction unit 312, and the image combining unit 314 as described above are placed into their inactive states to save power. Instead, the image extraction unit 316 operates.

The image extraction unit 316 performs an image extraction process on the input partial-view image to generate an extracted image. Note that the partial-view image 0 is used in FIG. 4, but the partial-view image 1 may be used in the image extraction process. In a similar manner to a partial-view image, the generated extracted image is image data expressed by planar coordinate system. The processes that are performed by the image extraction unit 316 correspond to the image extraction process 260 depicted in FIG. 3.

The mode switching unit 318 switches the operations of the output image selection unit 320, the joining position detection process 220, the joining process 250, and the image extraction process 260, according to the selected mode. The mode selection is made, for example, through a soft key of the application operating on the user terminal device 150, or through a hard key provided for the omnidirectional camera 110. More specifically, the mode switching unit 318 serves as a determination unit that determines whether or not to detect the joining position of two partial-view images using the joining position detection process 220. When it is determined to detect the joining position, the (1) capture mode is selected. When it is determined not to detect the joining position, the joining position is not detected, and the (2) angle-of-view check mode or the (3) brightness check mode is selected.

In the (1) capture mode and the (2) angle-of-view check mode, the output image selection unit 320 selects the combined image output from the image combining unit 314 as an output image. In the (3) brightness check mode, the output image selection unit 320 selects the extracted image output from the image extraction unit 316 as an output image.

Figure 12A:
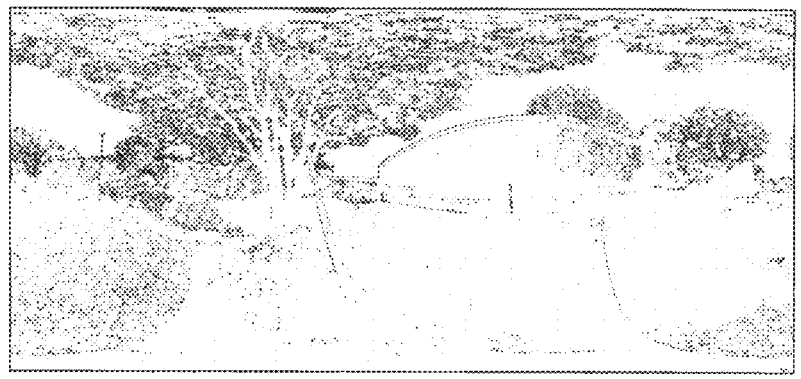
FIG. 12A, FIG. 12B, and FIG. 12C are diagrams illustrating examples of the output images generated in the modes of an omnidirectional imaging system, according to an embodiment of the present invention.
Figure 12B:
Figure 12C:
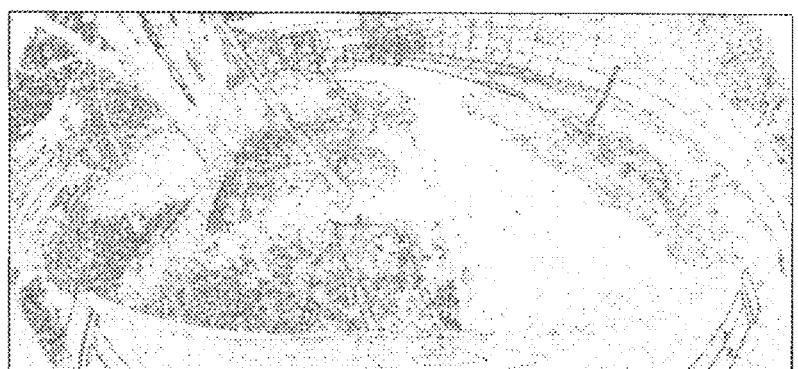

FIG. 12A, FIG. 12B, and FIG. 12C are diagrams illustrating examples of the output images generated in the modes of the omnidirectional imaging system 100, according to the present embodiment. As illustrated in FIG. 12A, the output image selected in the (1) capture mode becomes an image where the joining positions are precisely aligned and zenith correction is performed. By contrast, as illustrated in FIG. 12B, the output image selected in the (2) angle-of-view check mode becomes an image where the joining positions are aligned with sufficient image quality but zenith correction is not performed. As illustrated in FIG. 12C, the output image selected in the (3) brightness check mode becomes an image extracted from a fish-eye image in a rectangular shape.

The image processing block 300 illustrated in FIG. 4 may further include a monitor-image generation unit 322. The combined image generated as above is expressed in an omnidirectional image format. For this reason, if such a combined image is displayed on a planar display device such as a display just as it is, the distortion increases as the coordinate is in closer proximity to the pole where the vertical angle $\varphi$ is 0 degree or 180 degrees, and the accuracy of the joining position detection deteriorates. For the purpose of checking angle of view, it does not matter even if the image is displayed in an omnidirectional image format. However, in a desirable embodiment, image processing can be performed on the spherical image so as to be optimized for the projection on a planar display device.

In the (1) capture mode and the (2) angle-of-view check mode, the monitor-image generation unit 322 modifies a combined image in an omnidirectional image format such that the spherical coordinate system is sequentially converted into a planar coordinate system of a specific direction and angle of view, and projects the modified image on a frame of such a specific field-of-view direction and angle of view. Accordingly, an image that simulates a specific point of view and field of view can be monitored. In the (3) brightness check mode, the monitor-image generation unit 322 may display an output extracted image on the display just as it is, or may extract a portion of the output extracted image and display the extracted portion of image on the display.

In the above description, the display of a monitor image when it is ready to capture such a still image or video or when such a still image or video is being captured is described. Alternatively, a still image of the spherical image generated in the image processing path of the (1) capture mode may be generated and stored, or video of a series of images consisting of a plurality of frames of the omnidirectional image may be generated upon compression and stored.

FIG. 13 is a schematic diagram illustrating the reduction in the delay in displaying an image and the reduction in the power consumption, in the omnidirectional imaging system according to the present embodiment. In FIG. 13, the processes in each of the modes and the timing of the outputs corresponding to the input image frames are plotted on time base. Note that the throughput of each of the processes are schematically indicated by the width of the bar.

As illustrated in FIG. 13, in the (1) capture mode where the joining position detection process is performed, typically, the joining position detection process is performed over a time of several frames, and images are joined together after a time of several frames and an image is output. If a high-speed image processing chip is used to improve the performance of the image processing of the hardware, the delay can be shortened. However, the use of such a high-speed image processing chip leads to an increase in cost and power consumption.

By contrast, in the (2) angle-of-view check mode as described above, typically, the joining position detection process that requires a time of several frames can be skipped. Accordingly, the delay in displaying an image can be shortened and the power consumption can be reduced. For example, the process that takes a time of three frames in the capture mode on a particular processing chip can be shortened to a time of one frame. As a result, an image can be output after a one-frame delay. Further, in the (3) brightness check mode as described above, the joining process can be substituted by the image extraction process where the processing load is even lower. Accordingly, the power consumption can further be reduced.

According to the embodiments as described above, an image processing system, an image processing method, a program, and an imaging system can be provided that uses modes with which the delay in displaying an image can be shortened in the image processing where a plurality of input images are joined together to generate one image.

In the embodiments described above, the image processing system and the imaging system are described with reference to the omnidirectional imaging system 100 including the omnidirectional camera 110 and the user terminal device 150 that communicates with the omnidirectional camera 110.

In the omnidirectional imaging system 100 according to an alternative embodiment, the partial-view image acquisition process 210, the joining position detection process 220, the inclination detection process 230, the joining process 250, and the selection process 270 may physically be implemented by the hardware of the omnidirectional camera 110, and the monitor displaying process 280 may be implemented on the user terminal device 150. In such an alternative embodiment, the omnidirectional camera 110 outputs an output image according to the mode selected from among a plurality of modes, and the user terminal device 150 displays a monitor image based on the output image that varies according to the selected mode.

However, the configuration of the image processing system and imaging system is not limited to the embodiments described above. In an alternative embodiment, the omnidirectional camera 110 may implement all the image processing 210 to 280, and the omnidirectional camera 110 can include the image processing system, an image processing device, and the image processing system. In a further alternative embodiment, the image processing 220 to 280 excluding the partial-view image acquisition process 210 may be implemented on one or more external image processing device such as a personal computer or server including the user terminal device 150 in a distributed manner. For example, in a specific embodiment, the image processing 220 to 280 may be implemented on the user terminal device 150 that serves as an image processing device. In such an embodiment, the omnidirectional camera 110 obtains and outputs a plurality of partial-view images regardless of the mode, and the user terminal device 150 receives the multiple partial-view images output from the omnidirectional camera 110 and generates an output image according to the selected mode to display a monitor image.

In the embodiments described as above, in the inclination correction, the tilt angle is obtained with reference to the vertical direction. However, instead of the vertical direction, for example, the horizontal direction or another desired direction may be set as a reference direction, and the inclination of the image may be corrected based on the tilt of a prescribed object, such as the omnidirectional camera 110 or the imaging element 130A or 130B, with reference to the reference direction. In the embodiment described above, an acceleration sensor is used to detect the inclination. However, no limitation is indicated thereby, and another inclination sensor, such as a combination of an acceleration sensor and a geomagnetic sensor, may detect the inclination of, for example, the omnidirectional camera 110, the imaging element 130A or 130B attached to the omnidirectional camera 110, or the sensor itself.

The functional units as described above is realized by a computer-executable program written by legacy programming language or object-oriented programming language such as assembler language, C language, C++ language, C# language, and Java (registered trademark), and the program can be distributed via telecommunication line or upon being written on a computer-computer-readable recording medium such as ROM, electrically erasable and programmable read only memory (EEPROM), electrically programmable read only memory (EPROM), flash memory, flexible disk, compact disc read only memory (CD-ROM), compact disc rewritable (CD-RW), digital versatile disk (DVD)-ROM, DVD-RAM, DVD-RW, Blu-ray disc, secure digital (SD) card, and magneto-optical disc (MO). All or some of the functional units described above can be implemented, for example, on a programmable device such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, a hardware description language (HDL), Very High Speed Integrated Circuit Hardware Description Language (VHDL), or Verilog HDL.

Embodiments of the present invention has been described above, but the present invention is not limited to those embodiments and various applications and modifications may be made without departing from the scope of the invention.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image processing system comprising:
process selection circuitry configured to select an operating process of the image processing system from among at least a first process and a second process;
detection circuitry configured to detect a joining position among a plurality of image data to generate a detection result; and
joining circuitry configured to join the plurality of image data to generate an output image,
wherein:
when the operating process is selected to be the first process, the joining circuitry joins the plurality of image data based on the detection result of the detection circuitry to generate the output image, and
when the operating process is selected to be the second process, the joining circuitry joins the plurality of image data to generate the output image, without causing the detection circuitry to generate the detection result.

2. The image processing system according to claim 1, wherein:
the joining circuitry in the first process joins the plurality of image data using conversion data that reflects the detection result of the detection circuitry, and
the joining circuitry in the second process joins the plurality of image data using a prescribed conversion data.

3. The image processing system according to claim 1, further comprising:
extraction circuitry configured to extract at least one of the plurality of image data to generate the output image,
wherein the operating process further includes a third process in which the extraction circuitry extracts the at least one of the plurality of image data as the output image, without causing the detection circuitry to generate the detection result and without causing the joining circuitry to join the plurality of image data.

4. The image processing system according to claim 1, wherein the detection circuitry in the first process detects an amount of displacement among a plurality of corresponding points in an overlapping area existing among the plurality of image data.

5. The image processing system according to claim 1, wherein
the detection circuitry in the first process
detects a joining position among a plurality of images in a spherical coordinate system obtained by converting the plurality of image data, and
generates conversion data for generating the output image from the plurality of image data based on an inclination detection result obtained by an inclination sensor and the joining position detected among the plurality of image data in the spherical coordinate system.

6. The image processing system according to claim 5, wherein
the joining circuitry
converts the plurality of image data into a plurality of images in a spherical coordinate system, respectively, based on the conversion data, and
combines the plurality of image data in the spherical coordinate system to generate the output image.

7. The image processing system according to claim 1, further comprising:
monitor-image generation circuitry configured to display a monitor image on a display based on the output image joined according to the operating process which has been selected.

8. The image processing system according to claim 1, wherein the detection circuitry and the joining circuitry are implemented by hardware.

9. The image processing system according to claim 1, wherein the circuitry is further configured to implement:
image acquisition circuitry configured to obtain a partial-view image from a plurality of imaging units each of which includes a lens optical system and imaging element and captures an image of different direction to generate each one of the plurality of image data.

10. The image processing system according to claim 9, wherein
the plurality of imaging units each have prescribed angles of view,
the angles of view of the plurality of imaging units are joined together to meet a solid angle of $4\pi$ steradian, and
the output image generated by the joining circuitry is an omnidirectional image.

11. An image generation apparatus comprising:
determination circuitry configured to determine whether or not to detect a joining position of first image data and second image data; and
image generation circuitry configured to join the first image data and the second image data at a prescribed position when the determination circuitry determines not to detect the joining position.

12. The image generation apparatus according to claim 11, further comprising:
a detection circuitry configured to detect the joining position when the determination circuitry determines to detect the joining position; and
a generation circuitry configured to join the first image data and the second image data based on the joining position to generate an image.

13. A method of generating an image, the method comprising:
determining whether or not to detect a joining position of first image data and second image data; and
joining the first image data and the second image data at a prescribed position when the determining determines not to detect the joining position, to generate an image.

* * * * *